United States Patent
Kenworthy et al.

(10) Patent No.: US 10,253,785 B2
(45) Date of Patent: Apr. 9, 2019

(54) ENGINE HEAT EXCHANGER AND METHOD OF FORMING

(71) Applicant: Unison Industries, LLC, Jacksonville, FL (US)

(72) Inventors: Michael Thomas Kenworthy, Chandler, AZ (US); William Dwight Gerstler, Niskayuna, NY (US); Carlos Enrique Diaz, Munich (DE)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 15/252,748

(22) Filed: Aug. 31, 2016

(65) Prior Publication Data

US 2018/0058473 A1    Mar. 1, 2018

(51) Int. Cl.
| | | |
|---|---|---|
| *F02C 7/12* | (2006.01) | |
| *F28D 1/02* | (2006.01) | |
| *F28F 3/04* | (2006.01) | |
| *F28F 7/02* | (2006.01) | |
| *B23P 15/26* | (2006.01) | |
| *F04D 29/58* | (2006.01) | |
| *F28D 21/00* | (2006.01) | |
| *F28F 13/12* | (2006.01) | |

(52) U.S. Cl.
CPC ............ *F04D 29/584* (2013.01); *B23P 15/26* (2013.01); *F02C 7/12* (2013.01); *F28D 1/0246* (2013.01); *F28F 3/04* (2013.01); *F28F 7/02* (2013.01); *F28F 13/12* (2013.01); *F05D 2260/213* (2013.01); *F28D 2001/0273* (2013.01); *F28D 2021/0026* (2013.01); *F28F 2215/04* (2013.01); *F28F 2255/16* (2013.01)

(58) Field of Classification Search
CPC ......... F04D 29/584; B23P 15/26; B60H 1/02; B60H 1/04; B60H 1/16; B60H 1/025; B60H 1/18
USPC ...................... 165/51, 52, 54, 55, 56, 57, 47
See application file for complete search history.

(56) References Cited

U.S. PATENT DOCUMENTS

| | | | | |
|---|---|---|---|---|
| 4,592,420 A | * | 6/1986 | Hughes ..................... | F28F 1/32 165/151 |
| 6,349,761 B1 | * | 2/2002 | Liu ........................... | F28F 1/32 165/150 |

(Continued)

FOREIGN PATENT DOCUMENTS

| EP | 1 916 399 A2 | 4/2008 |
|---|---|---|
| EP | 2 339 159 A2 | 6/2011 |

(Continued)

OTHER PUBLICATIONS

Extended European Search Report and Opinion issued in connection with corresponding EP Application No. 17187932.3 dated Feb. 2, 2018.

(Continued)

*Primary Examiner* — Justin M Jonaitis
(74) *Attorney, Agent, or Firm* — General Electric Company; Pamela A. Kachur

(57) ABSTRACT

A heat exchanger for a turbine engine having a body including a first surface, a second surface opposite the first surface, and at least one fluid passage configured to carry a flow of heated fluid proximal to the second surface and where the body is arranged to transfer heat from the heated fluid to a cooling fluid passing by the second surface.

16 Claims, 10 Drawing Sheets

(56) References Cited

U.S. PATENT DOCUMENTS

| | | | |
|---|---|---|---|
| 7,347,254 B2 | 3/2008 | Pantow et al. | |
| 7,878,233 B2* | 2/2011 | Bates | F02B 29/0456 |
| | | | 123/563 |
| 8,381,802 B2* | 2/2013 | Nishino | F28F 13/12 |
| | | | 165/109.1 |
| 8,434,723 B2 | 5/2013 | Simpson et al. | |
| 8,683,905 B2* | 4/2014 | Swinford | B21J 5/12 |
| | | | 83/13 |
| 9,079,658 B2 | 7/2015 | Smith et al. | |
| 9,677,474 B2* | 6/2017 | Hundley, Jr. | F02C 7/32 |
| 2007/0098509 A1* | 5/2007 | Hall | B23B 5/167 |
| | | | 409/132 |
| 2009/0223648 A1* | 9/2009 | Martin | F28F 1/40 |
| | | | 165/86 |
| 2012/0012284 A1 | 1/2012 | Salamon | |
| 2013/0152392 A1* | 6/2013 | Swinford | B23H 7/02 |
| | | | 29/890.03 |
| 2014/0027102 A1 | 1/2014 | Antel, Jr. et al. | |
| 2015/0000865 A1* | 1/2015 | Ueda | F28F 3/02 |
| | | | 165/51 |
| 2016/0090863 A1 | 3/2016 | Diaz et al. | |
| 2016/0108814 A1* | 4/2016 | Schmitz | F02C 7/10 |
| | | | 60/39.511 |
| 2017/0276440 A1* | 9/2017 | Kenworthy | F28F 13/003 |

FOREIGN PATENT DOCUMENTS

| | | |
|---|---|---|
| JP | H03-45896 A | 2/1991 |
| JP | 2006-266528 A | 10/2006 |
| JP | 2014-098508 A | 5/2014 |
| JP | 2015-528890 A | 10/2015 |
| JP | 2016-003644 | 1/2016 |

OTHER PUBLICATIONS

Machine Translation and Copy of Notification of Reasons for Refusal issued in connection with corresponding JP Application No. 2017-157294 on Nov. 6, 2018.

* cited by examiner

ENGINE HEAT EXCHANGER AND METHOD OF FORMING

BACKGROUND OF THE INVENTION

Turbine engines, particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Turbine engines used in aircraft produce substantial amounts of heat that must be transferred away from the engine. Heat exchangers provide a way to transfer heat away from such engines. For example, heat exchangers can be arranged in a ring about a portion of the engine.

Oil can be used to dissipate heat from engine components. Heat is typically rejected from the oil to air by heat exchangers to maintain oil temperatures at a desired range from approximately 100° F. to 300° F. Fins provided on a surface of the heat exchanger are used to increase heat transfer from oil to the air by convection. Increasing the efficiency at which the heat is removed is always desirable.

BRIEF DESCRIPTION OF THE INVENTION

In one aspect, the present disclosure relates to a heat exchanger for a turbine engine, the heat exchanger comprising a heat exchanger body including a first surface, a second surface opposite the first surface, and at least one conduit configured to carry a flow of heated fluid proximal to the second surface. The body is arranged to transfer heat from the heated fluid to a cooling fluid passing by the second surface a set of fins extending from the second surface and a set of heat transfer augmentation structures disposed on the second surface to augment a flow of cooling fluid wherein the set of heat transfer augmentation structures is configured to increased heat transfer by manipulating an approach of the flow of cooling fluid.

In another aspect, the present disclosure relates to a method of forming a heat exchanger, the method comprising extruding a metal body, with the metal body having an upper surface and at least one fluid passage in the metal body, forming a set of fins that are attached to the upper surface of the metal body, and forming a set of heat transfer augmentation structures on the upper surface of the metal body.

DESCRIPTION OF DISCLOSURES OF THE INVENTION

Aspects of the present disclosure herein relate to heat exchangers and more particularly to the placement of turbulators in relationship to surface fins proximate a heat exchanger in an engine such as an aircraft engine. The exemplary heat exchangers can be used for providing efficient cooling. Further, the term "heat exchangers" as used herein can be used interchangeably with the term "surface coolers." As used herein, the heat exchangers are applicable to various types of applications such as, but not limited to, turbojets, turbo fans, turbo propulsion engines, turbo-shafts aircraft engines, gas turbines, steam turbines, wind turbines, and water turbines.

Figure 1:
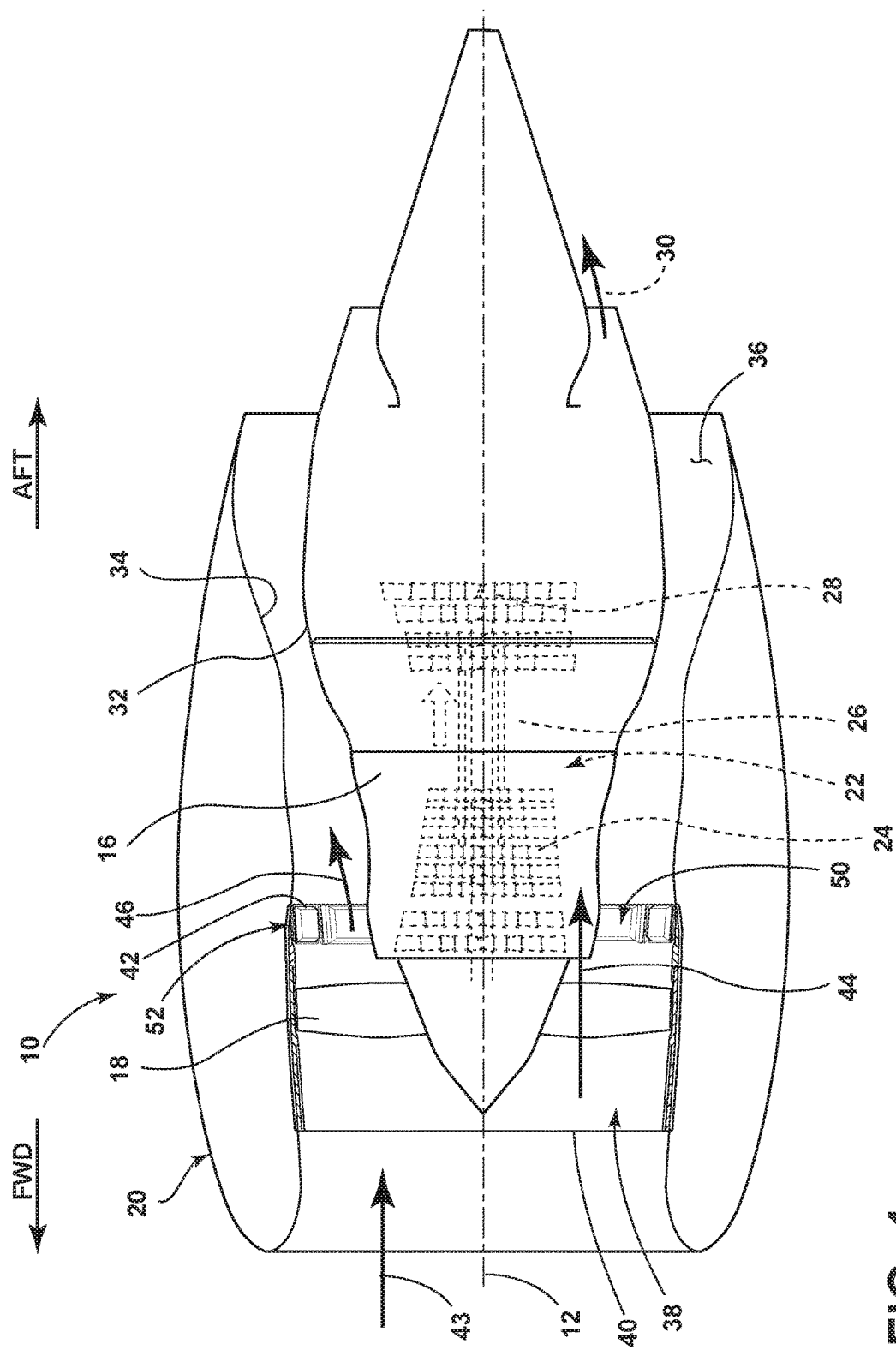
FIG. 1 is a schematic cross-sectional diagram of a gas turbine engine for an aircraft in accordance with various aspects described herein.

FIG. 1 provides a brief explanation of the environment in which aspects of the disclosure can be used. More specifically, FIG. 1 illustrates an exemplary turbine engine assembly 10 having a longitudinal axis 12. A turbine engine 16, a fan assembly 18, and a nacelle 20 can be included in the turbine engine assembly 10. The turbine engine 16 can include an engine core 22 having compressor(s) 24, combustion section 26, turbine(s) 28, and exhaust 30. An inner cowl 32 radially surrounds the engine core 22.

Portions of the nacelle 20 have been cut away for clarity. The nacelle 20 surrounds the turbine engine 16 including the inner cowl 32. In this manner, the nacelle 20 forms an outer cowl 34 radially surrounding the inner cowl 32. The outer cowl 34 is spaced from the inner cowl 32 to form an annular passage 36 between the inner cowl 32 and the outer cowl 34. The annular passage 36 characterizes, forms, or otherwise defines a nozzle and a generally forward-to-aft bypass duct for an airflow path. A fan casing assembly 38 having an annular forward casing 40 and an aft casing 42 can form a portion of the outer cowl 34 formed by the nacelle 20 or can be suspended from portions of the nacelle 20 via struts (not shown).

During operation, air flows 43 through the fan assembly 18 and a first portion 44 of the airflow 43 is channeled through compressor(s) 24 wherein the first portion of the airflow 44 is further compressed and delivered to the combustion section 26. Hot products of combustion (not shown) from the combustion section 26 are utilized to drive turbine (s) 28 and thus produce engine thrust. The annular passage 36 is utilized to bypass a second portion 46 of the airflow discharged from fan assembly 18 around engine core 22.

The turbine engine assembly 10 can pose unique thermal management challenges and a heat exchanger system or heat exchanger 50 can be attached to the turbine engine assembly 10 to aid in the dissipation of heat. In the exemplary disclosure, the heat exchanger 50 can be an annular fan heat exchanger 50 that can be operably coupled to a casing 52 having a peripheral wall 54 (FIG. 2) that forms an interior portion of the outer cowl 34. The heat exchanger 50 can be any suitable cooler including an air-cooled oil cooler. The casing 52, in non-limiting examples, can be the fan casing assembly 38, or the forward casing 40 or aft casing 42. It should be appreciated that the casing 52 can be any casing region, such that the casing encloses any structural hardware that is part of the annular duct defined by the casing assembly 52. Thus, the heat exchanger 50 can couple to the casing 52 at any position along the duct defined by the casing assembly 38.

Figure 2:
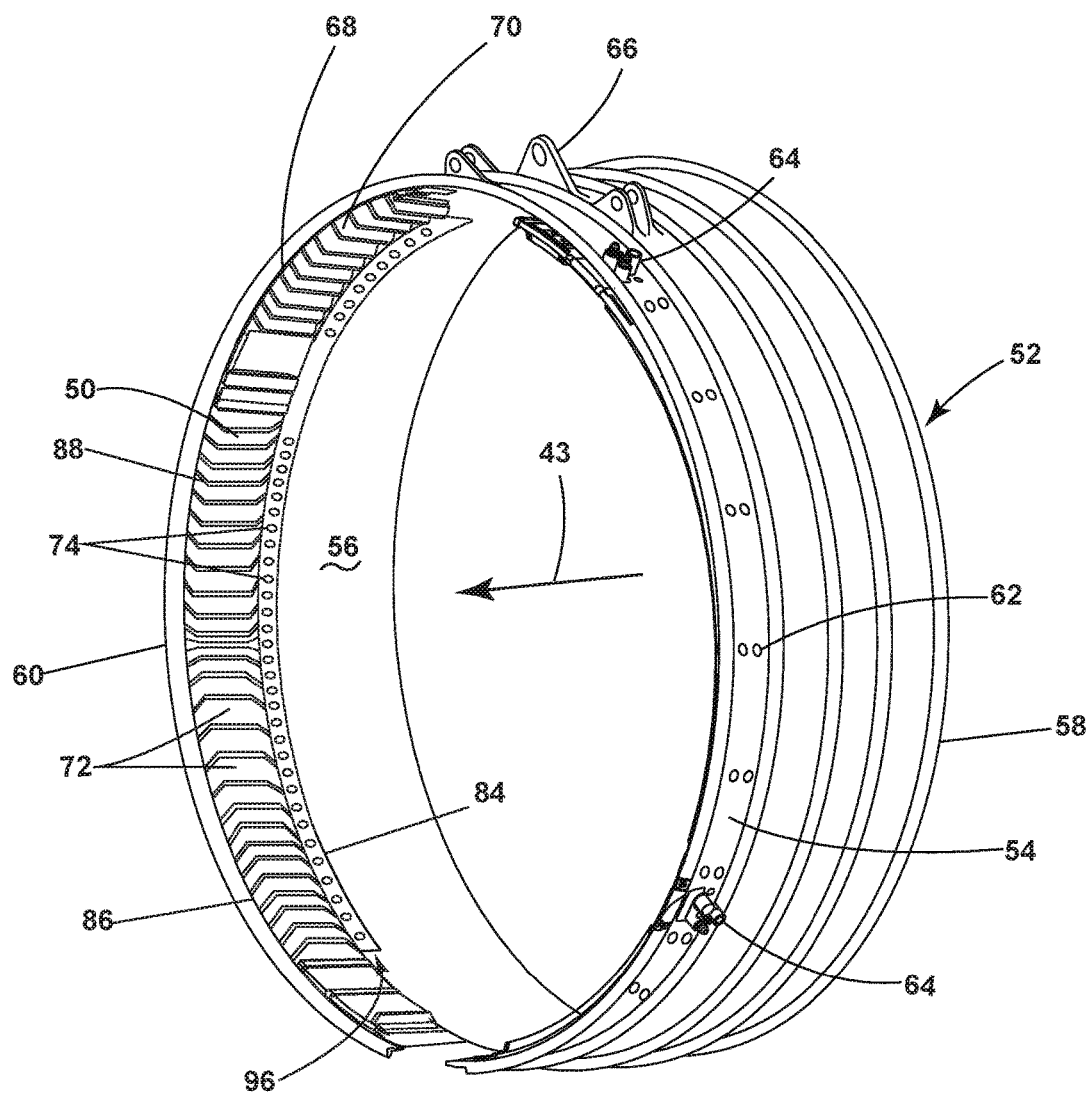
FIG. 2 is a perspective view of a casing of the gas turbine engine from FIG. 1 in accordance with various aspects described herein.

FIG. 2 illustrates one exemplary casing 52 of the fan casing assembly 38 (FIG. 1). The heat exchanger 50 can cover any portion of the peripheral wall 54, and is not limited to the size as illustrated. It will be understood that a set of heat exchangers 50 can be utilized to cool a single turbine engine assembly 10. It will be understood that "a set" as used herein can include any number including only one. Such a set can be disposed in axial arrangement along the peripheral wall 54. The casing 52 includes a forward edge 58 and an opposing aft edge 60. Fan casing fastener openings 62 pass through the peripheral wall 54 as well as manifold openings 64. Multiple casing mounts 66 can mount along the exterior of the casing 52 for mounting the casing 52 to the outer cowl 34. Such casing mounts 66 can include, but are not limited to, clevis mounts.

The heat exchanger 50 can be by non-limiting examples an air-cooled or oil-cooled heat exchanger that is provided on an interior surface 56 of the casing 52. The heat exchanger 50 can have a first surface 68 and a second surface 70 wherein the second surface 70 is an upper surface of a body 88 of the heat exchanger 50. A set of fins 72 can extend radially toward the airflow 43 from the second surface 70. Provided upstream of the fins 72 is a set of heat transfer augmentation structures 74 illustrated as a plurality of augmentation structures 74 in a row 96. A heat transfer augmentation structure can be any structure formed to control airflow upon reaching the set of fins 72. While illustrated as circles, some non-limiting examples of the heat transfer augmentation structures 74 are dimples 276 or grooves 278 (FIG. 4) formed into the second surface 70 of the heat exchanger 50 or vortex generators 280 (FIG. 4) formed to protrude from the second surface 70. It can be contemplated that the set of heat transfer augmentation structures 74 can be provided on the second surface 70 along a leading edge 84 of the heat exchanger 50 or be mounted directly to the interior surface 56, or to a separate annular structure, or in any other suitable manner.

While the heat exchanger 50 has been illustrated as being downstream of the fan assembly 18 it is also contemplated that the heat exchanger 50 can alternatively be upstream from fan assembly 18, or at any position along the outer cowl 34. Further still, while not illustrated, the heat exchanger 50 can be located adjacent the inner cowl 32. As such, it will be understood that the heat exchanger 50 can be positioned anywhere along the axial length of the annular passage 36.

The heat exchanger 50 can be shaped and combined in any suitable manner with additional sections of any suitable shape and size such that a heat exchanger or heat exchanger assembly of varying proportions may be made and may be used in a variety of different applications including by way of non-limiting example with a variety of different engines. The heat exchanger body 88 can be formed and partitioned in any suitable way such that at least a section of the heat exchanger 50 is formed and can be mounted in sections if necessary.

Having a set of fins 72 provided with the heat exchanger body 88 promotes improved airflow mixing by allowing heat within the body 88 from a heated air or oil to move by convection from the air or oil to the upper surface 70 and out through the set of fins 72 to the surrounding environment.

The set of fins 72 and the set of heat transfer augmentation structures 74 described herein can be machined, extruded, or formed using additive manufacturing such as spray technology, LENS (Laser engineering net shaping) and cold spray technology or ultrasonic layer build-up.

A plurality of configurations exist regarding the placement and inclusion of the heat exchanger 50. Therefore, multiple exemplary heat exchangers are described herein with like parts identified with like numerals increasing by 100. It is understood that the description of the like parts of each exemplary heat exchanger applies to other exemplary heat exchangers, unless otherwise noted.

Figure 3:
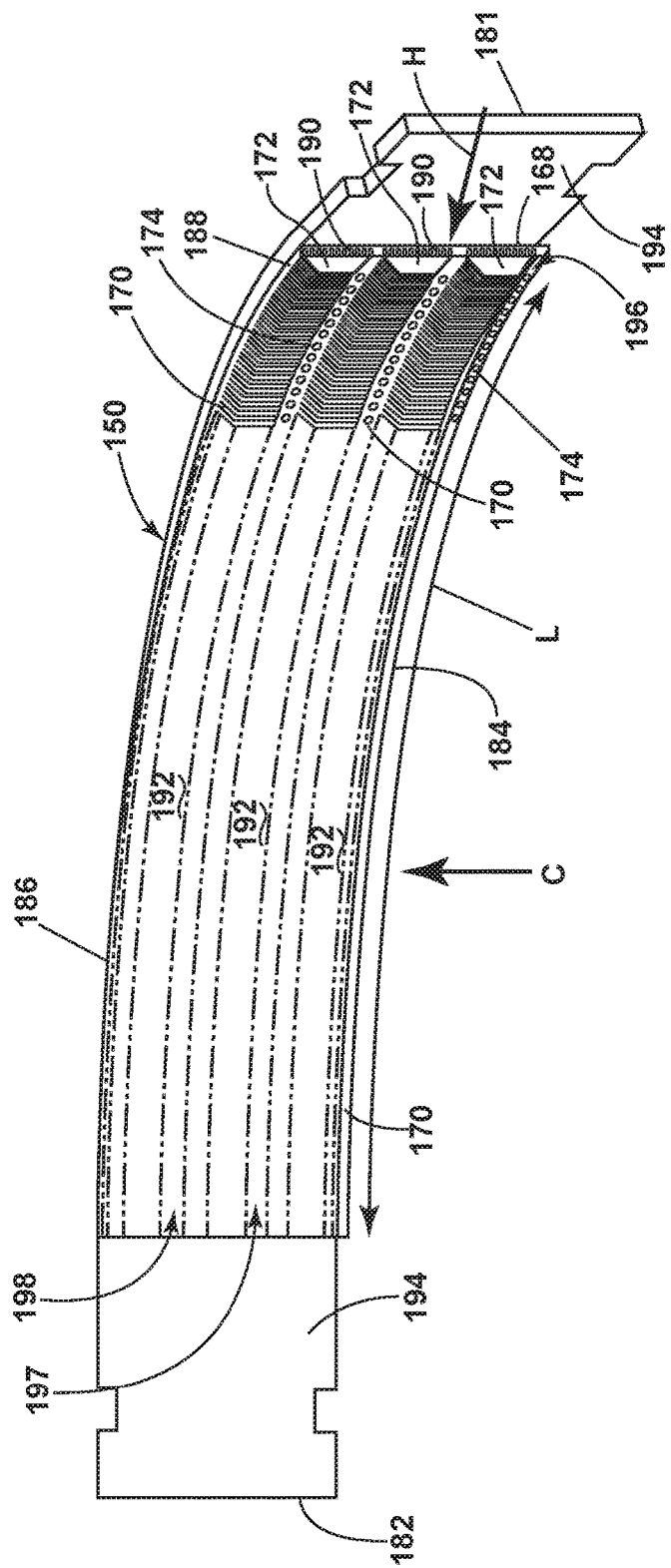
FIG. 3 is an exemplary heat exchanger for the gas turbine engine of FIG. 1 in accordance with various aspects described herein.

Referring now to FIG. 3, an exemplary heat exchanger 150 according to one aspect of the disclosure herein is illustrated. The heat exchanger 150 can form a cylindrical or conical design, extending circumferentially or tangentially within the fan casing assembly 38 (FIG. 1). The annular heat exchanger 150 can extend at least partially around the circumferential length of the fan casing assembly 38 along the interior surface 56 (FIG. 2). The heat exchanger 150 includes a first end 180 and a second end 182, defining a circumferential direction between the ends 180, 182 and extending between a leading edge 184 and a trailing edge 186.

The heat exchanger 150 can include a body 188 formed from, for example but not limited to, metal extending radially from a first surface 168 to a second surface 170 or upper surface 170. The body 188 can include a set of conduits, shown as a plurality of fluid passages 190 in the body 188. A mount 194 can be disposed at each of the ends 180, 182 for mounting the heat exchanger 150 to the engine 16.

A set of fins 172 can extend from the body 188. The fins 172 can include, but are not limited to, segmented fins 192. In the illustrated example, the segmented fins 192 are three sets of fins 172, or "segments" of one elongated fin. It is contemplated that the sets of fins 172 forming the segmented fins 192 can be of differing geometries, shapes, or profiles, or can be of similar geometry, shape, or profile, as illustrated. The set of fins 172 can be one of a plurality of configurations including, but not limited to, segmented fins, petal fins, continuous fins, discrete fins or any other configuration suitable for use with the heat exchanger 150.

In accordance with one aspect of the present disclosure, at least one heat transfer augmentation structure 174 is provided along at least a portion of a length L of the heat exchanger body 188 where the at least one heat transfer augmentation structure 174 is a set of heat transfer augmentation structures 174 which can be one or a plurality of heat transfer augmentation structures 174 spaced along the length L of the heat exchanger body 188. The at least one heat transfer augmentation structure 174 can be intermittently disposed between corresponding sets of fins 172.

During operation, a hot fluid H is passed through the passages 190. The hot fluid H can include heated air or oil that flows through the body 188 proximal to the upper surface 170. Heat from the fluid may be conducted through the body 188 and can be dissipated through the set of fins 172 to a cooling fluid C passing by the fins 172. The cooling fluid C can include, but is not limited to, cooling air passing through the annular passage 36, which by way of a non-limiting example can be a bypass duct of the turbine engine 10. Segmented fins 192 in particular can change the airflow pattern, reinitiating a boundary layer at each new fin which can result in a higher amount of heat transfer.

Figure 4:
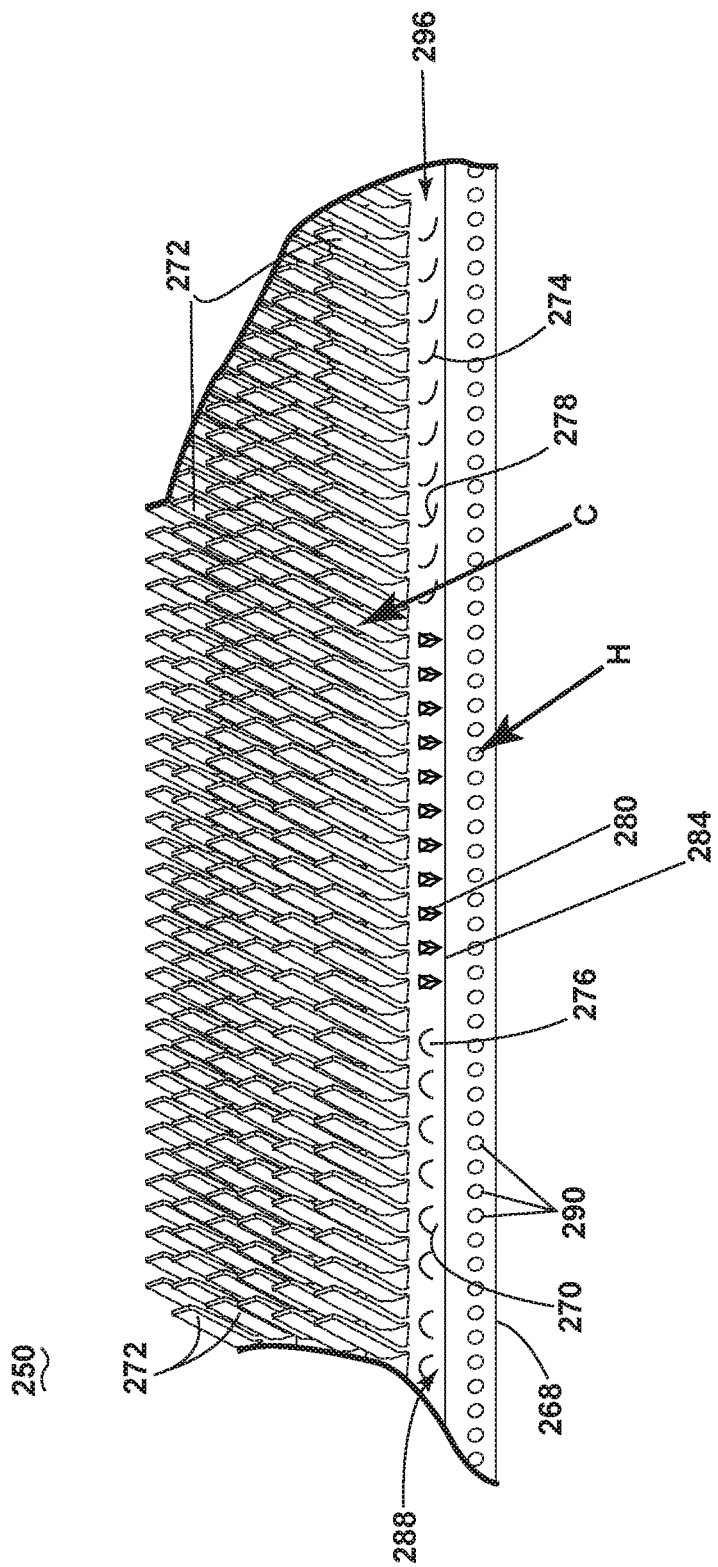
FIG. 4 is a second exemplary heat exchanger for the gas turbine engine of FIG. 1 in accordance with various aspects described herein.

The cooling fluid C passes by the upper surface 170 between the set of fins 172. The set of heat transfer augmentation structures 174 can extend from the upper surface 170 of the heat exchanger 250 to augment the flow of cooling fluid C by producing a turbulent flow (FIGS. 6A and 6B). In FIG. 4, a non-limiting example of a set of fins 272 are petal fins formed using an advancement of a skiving blade (not shown) into the second or upper surface 270 such that the set of fins 272 is formed from the same material as the upper surface 270 so as to remain attached to an integral with a heat exchanger body 288.

It is understood that the set of fins 72, 172, 272 described herein can mount to or be formed from the body 88, 188, 288 using any suitable technique known in the art and the methods described herein are for exemplary purposes only and not meant to be limiting.

On a leading edge 284 three different geometrical, profiles, or contours are given by way of non-limiting exemplary illustrations for the heat transfer augmentation structures 274. While illustrated as a first, second, and third set of heat transfer augmentation structures 276, 278, 280 it should be understood that for any heat exchanger described herein the sets of heat transfer augmentation structures 274 illustrated in FIG. 4 can be formed in rows of like geometric profiles, or contours, and rows of differing geometric profiles, or contours, or a combination of both like and differing geometries profiles, or contours depending on the limitations and requirements of the heat exchanger 250.

In one aspect the set of heat transfer augmentation structures 274 can be one of a dimple 276 or a groove 278 in the upper surface 270 of the body 288. The dimple 276 or groove 278 can be formed using a skiving blade as previously described herein or during additive manufacturing of the upper surface 270 of the heat exchanger 250 or of the entire heat exchanger 250.

In another aspect, the third set of heat transfer augmentation structures 280 is a set of vortex generators 280 provided on the leading edge 284 of the heat exchanger 250. A set of heat transfer augmentation structures can be a set of vortex generators in that they change the flow path of the air upon reaching the heat transfer augmentation structure. Vortex generators do not, however describe all heat transfer augmentation structures. Vortex generators, as described herein, specifically refer to an element that extends from the surface 270 of the heat exchanger 250. It is contemplated that the set of vortex generators 280 can be stationary or movable.

In the case of stationary vortex generators 280, the set of vortex generators 280 can be formed by utilizing a spray additive technique to build the set of vortex generators 280 on the upper surface 270 of the body 288. While schematically illustrated as a conical trapezoid, the set of vortex generators 280 can have a rectangular, parabolic, triangular, ogive, trapezoidal, planar or any other suitable shape, contour, or profile.

Figure 5:
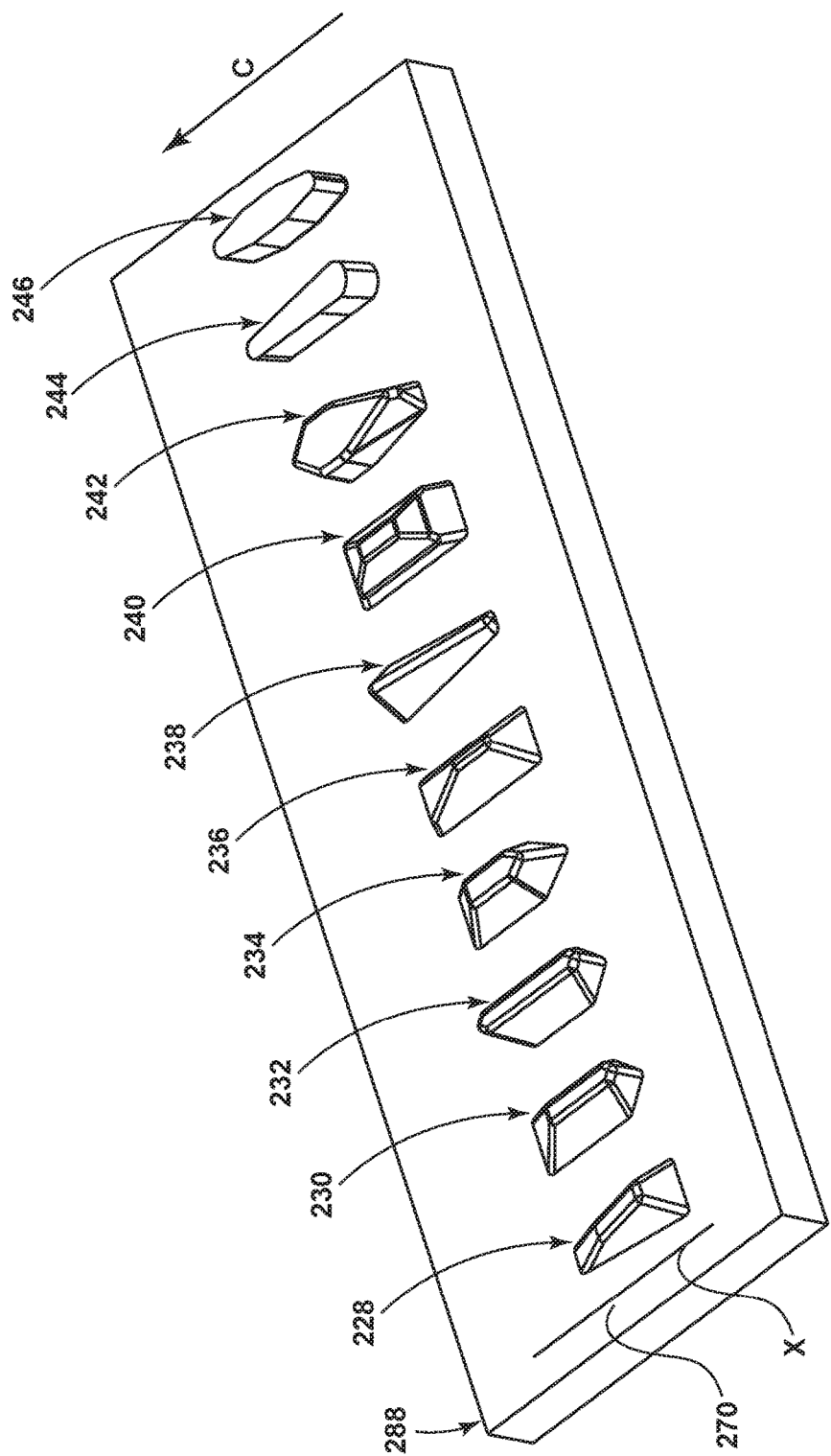
FIG. 5 is a perspective view of exemplary vortex generators in accordance with various aspects described herein.

The body contour of the set of vortex generators 280 can also impact the performance of the set of vortex generators 280. The body contour of a vortex generator can be defined by its cross-sectional shape and/or its planform. Referring to FIG. 5, the cross-sectional shape can be viewed in a plane orthogonal to the body axis X of the vortex generator. The planform is the contour of the vortex generator as viewed from above the upper surface 270 described herein from which the set of vortex generators projects.

The body shape, profile, or contour of the heat transfer augmentation structures described herein can impact the performance of the heat transfer augmentation structures. Some non-limiting examples of cross-sectional shapes include rectangular, triangular, and trapezoidal, and may be at least partially defined by the shape of the leading and trailing surfaces of the vortex generator. Some non-limiting examples of shapes for the leading the trailing surfaces include ramped, wedged, or rounded. For example, the leading surfaces of vortex generators 228, 236, 240, 242 are ramped; those of vortex generators 230, 232, 234, 238 are wedged; and those of vortex generators 244, 246 are rounded. The trailing surfaces of vortex generators 228, 230, 234, 236, 238, 240 are ramped; those of vortex generators 232, 242 are wedged; and those of vortex generators 244, 246 are rounded. The ramped, wedged, or rounded surfaces help maintain a high cooling fluid velocity along the upper surface 270 which can reduce the tendency for dust to accumulate on the upper surface 270.

Some non-limiting examples of planforms include rectangular, trapezoidal, diamond-shaped, kite-shaped, teardrop-shaped, ovoid, elliptical, pentagonal, hexagonal, and heptagonal. For example, the vortex generator 228 has a generally trapezoidal planform, the vortex generators 230, 234 have a generally pentagonal planform, the vortex generator 232 has a generally hexagonal planform, the vortex generators 236, 242 have a generally heptagonal planform, the vortex generator 238 has a generally kite-shaped planform, the vortex generator 240 has a generally rectangular planform, the vortex generator 244 has a generally teardrop-shaped planform, and the vortex generator 546 has a generally elliptical planform.

An exemplary vortex generator 238 includes a generally kite-shaped planform with a wedged leading surface and a ramped trailing surface allows for smaller vortices to initiate at the leading surface and grow along the diverging and expanding side walls that intersect the upper surface 270. The kite-shaped planform presents a small initial disturbance to the cooling fluid flow that grows naturally as a vortex on both side walls.

In any of the above exemplary vortex generators, it is understood that while the drawings may show the vortex generators having sharp corners, edges, and/or transitions with the cooling surface for purposes of illustration, is may be more practical for the corners, edges, and/or transitions to be smoothly radiused or filleted. Furthermore, exemplary vortex generators of the vortex generators illustrated as having smoothly radiused or filleted corners, edges, and/or transitions with the cooling surface may instead have sharp corners, edges, and/or transitions.

In any of the above exemplary vortex generators, while illustrated an upper surface 270, the location of the vortex generators is not so limited. For example, they can be located on opposing surfaces, adjacent surfaces, or all of the surfaces for that matter. The vortex generators can also be located on a surface extending into or from the surfaces defining the upper surface 270.

In the case of a movable set of vortex generators 280 there can be at least one thermally sensitive portion configured to passively position the movable vortex generator 280 in certain thermal conditions. The set of vortex generators 280 can be made at least partially of thermally sensitive materials, such that the set of vortex generators 280 can at least partially deform based upon a change in thermal condition, such as an increase or decrease in temperature. It is also contemplated that the set of vortex generators 280 can be actively moved for example but not limited to a mechanical actuator.

Figure 6:
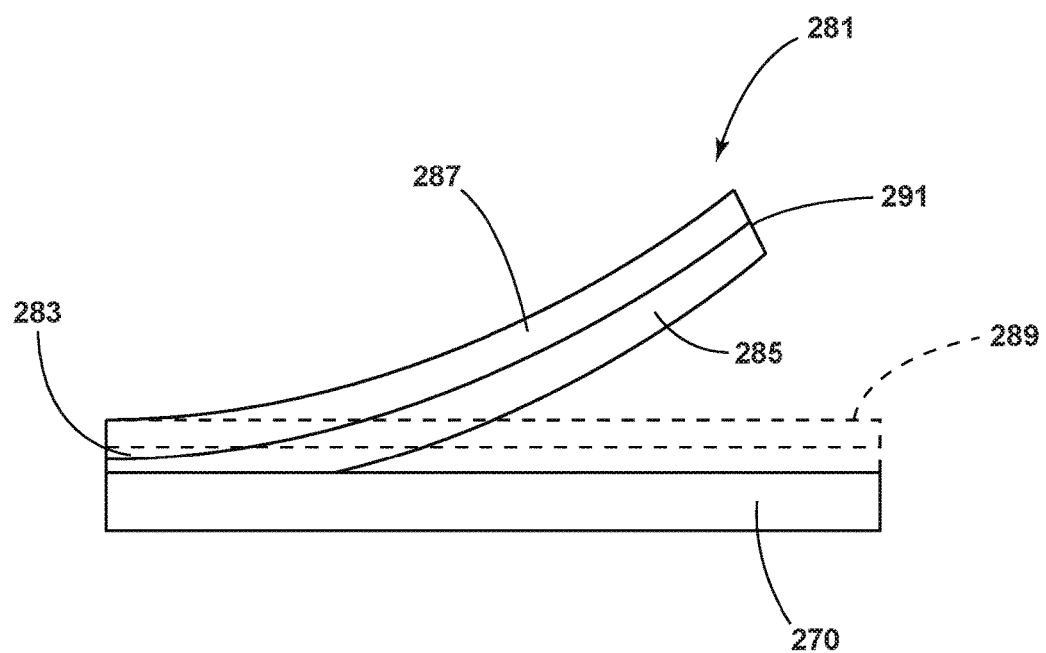
FIG. 6 is a schematic illustration of an exemplary vortex generator in accordance with various aspects described herein.

Turning to FIG. 6 in one example, an exemplary set of vortex generators 281 can be a bi-metal or shape-memory alloy plate 283. Under such an example, the thermal activation of the bi-metal (or shape memory alloy) plate 283 can be tuned by appropriate coefficient of thermal expansion material selection and sizing of directly bonded aluminum alloy and aluminum metal matrix composite (MMC), aluminum silicon carbide sheets (AlSiC). For example, the upper surface 270 can include a thermally conductive, malleable layer 285, capable of deformation and reformation, and a thermally actuable, MMC layer 287, extending along the length of the malleable layer 285 that deforms relative to a change in temperature. The MMC layer 287 can at least partially define the set of vortex generators 281 in order to particularly determine the geometric change of the vortex generators 281.

Ultrasonic additive manufacturing (UAM) or other alternative metal bonding/deposition processes can be used to laminate the dissimilar materials to produce a monolithic laminate composite metal sheet to form the set of vortex generators 281. The dissimilar materials can include the malleable layer 285 and the MMC layer 287, comprised of first and second materials. The first and second materials can include, but are not limited to, a high strength aluminum alloy as the malleable layer 285 and AlSiC as the MMC layer 287. Any suitable materials can be utilized and such material selection creates the temperature dependent internal differential strain. In the above materials example, a bi-metal layer is formed from the layer of aluminum alloy and layer of AlSiC. The volume fraction percentage of silicon carbide (SiC) within the AlSiC can be varied to tune the coefficient of thermal expansion (CTE). Depending on the percentage of SiC, the CTE for AlSiC can vary from 7 to 20 ppm/C, while additional percentages and materials are contemplated from 5 to 35 ppm/C. Such a design can cause actuation or deformation of the set of vortex generators 280 relative to change in local conditions, and more particularly, temperature. Further still, binary and ternary Ni—Ti shape memory foils can be incorporated as an additional thermal actuation material or in conjunction with MMC foils. These alloys are designed to activate and change shape at specific tunable temperatures. Such shapes can be particularly created based upon the tuning of local percentages of the SiC throughout the set of vortex generators 280, for example, or other shape memory alloy materials. Additionally, other metal alloy and smart metal material tapes can be utilized.

The alloys and smart metals used can be additively fabricated, such as using the UAM process or additive electroforming, providing for low mass as well as optimization for maximum cooling of the heat exchanger 250. Furthermore, the addition of complex 3D printed kinematic features is possible using a combination of in-situ machining, layered ultrasonic welding, and secondary laser welding.

UAM processing is used to create the metals parts by continuously scrubbing metal foils together with ultrasonic vibration under pressure. UAM processing works with a variety of metals such as aluminum, copper, stainless steel, and titanium. During the continuous scrubbing, the metals are joined together in their solid state with a roughening of surface oxide films between the metals. In combining additive and subtractive process capabilities, UAM can create deep slots, hollow, latticed, or honeycombed internal structures, and other complex geometries. Additionally, the solid state nature of the UAM bond allows for welding of dissimilar metals. This enables dissimilar metal cladding, production of custom metal matrix composites, and the ability to embed objects or sensors in a metal substrate.

As described herein, the heat exchanger 50 can be manufactured as a separate entity and then a flow augmentation structure 74 can be added during production by implementing UAM processing to join the metal material of the heat transfer augmentation structure 74 to the heat exchanger 50.

It is also further contemplated that the set of vortex generators 281 can be mechanically actuated to move from a first position 289 to a second position 291 as illustrated.

It is also contemplated that the set of vortex generators 280 along with each set of heat transfer augmentation structures 74, 174, 274 can mount to or be formed from the body 88, 188, 288 at the leading edge 84, 184, 284 or at any other suitable location on the upper surface 70, 170, 270 of the heat exchanger 50, 150, 250. The heat transfer augmentation structures 74, 174, 274 can be formed using any suitable technique known in the art for example, but not limited to, using additive manufacturing or a skiving blade as previously described herein. The methods and types described herein are for exemplary purposes only and not meant to be limiting.

With reference to the exemplary heat exchangers described herein, shape of the set of heat transfer augmentation structures 74, 174, 274, and the set of vortex generators 280, 281 including the orientation and dimensions of the set of heat transfer augmentation structures 74, 174, 274 and the set of vortex generators 280, 281 relative to the orientation and position of the set of fins 72, 172, 272, impacts the performance of the set of heat transfer augmentation structures 74, 174, 274 and the set of vortex generators 280, 281 when inducing vortices in the cooling fluid C.

The orientation of the set of heat transfer augmentation structures 74, 174, 274 and the set of vortex generators 280, 281 relative to the proximate sets of fins 72, 172, 272 from a top view perspective will be further described.

FIGS. 7A, 7B, 7C, and 7D are top view schematic illustrations of exemplary orientations for a set of heat transfer augmentation structures 374 in relationship to a set of fins 372. For clarity and ease of description, part numbers in the numerical 300 range will be used with it being understood that these part numbers refer to all corresponding part numbers differing by a factor of 100 and can apply to any of the exemplary heat exchangers described herein. While illustrated as circles and lines, it should be understood that both the heat transfer augmentation structures 374 and fins 372 can have differing geometries and shapes as previously described herein.

Figure 7A:
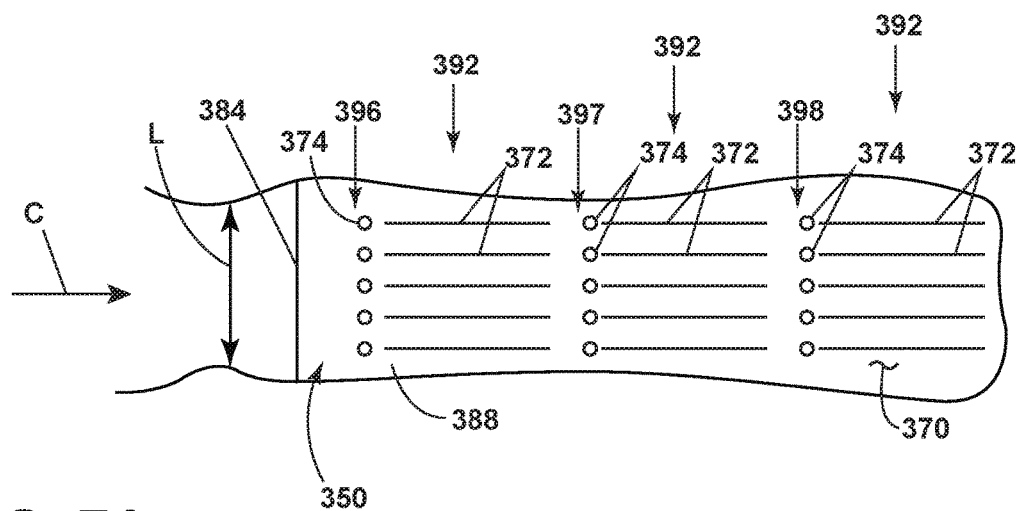
FIGS. 7A-7D are schematic configurations for fins and heat transfer augmentation structures of the exemplary heat exchangers in accordance with various aspects described herein.

FIG. 7A shows the heat transfer augmentation structures 374 arranged in a first row 396 along a leading edge 384 of an upper surface 370 of a heat exchanger 350 perpendicular to the airflow direction 343. The heat transfer augmentation structures 374 are further arranged in multiple rows 397, 399 intermittently disposed between sets of fins 372 arranged in segmented fin rows 392 where the segmented fin rows 392 are spaced between 0.78 and 12.7 mm (1/32 and 1/2 inches) apart. The set of fins 372 are arranged such that six to eight fins are provided per inch along the length L of the heat exchanger 350.

Each row 396, 397, 398 includes heat transfer augmentation structures 374 spaced at least 1.5 mm (1/16 inches) apart and up to 12.7 mm (1/2 inches) apart and in line with corresponding sets of fins 372. Each set of heat transfer augmentation structures 374 is formed between 3.1 and 12.7 mm (⅛ and ½ inches) measured axially from the set of fins 274. The set of heat transfer augmentation structures 374 can be formed at a maximum of 1 inch from the set of fins 274.

Figure 7B:
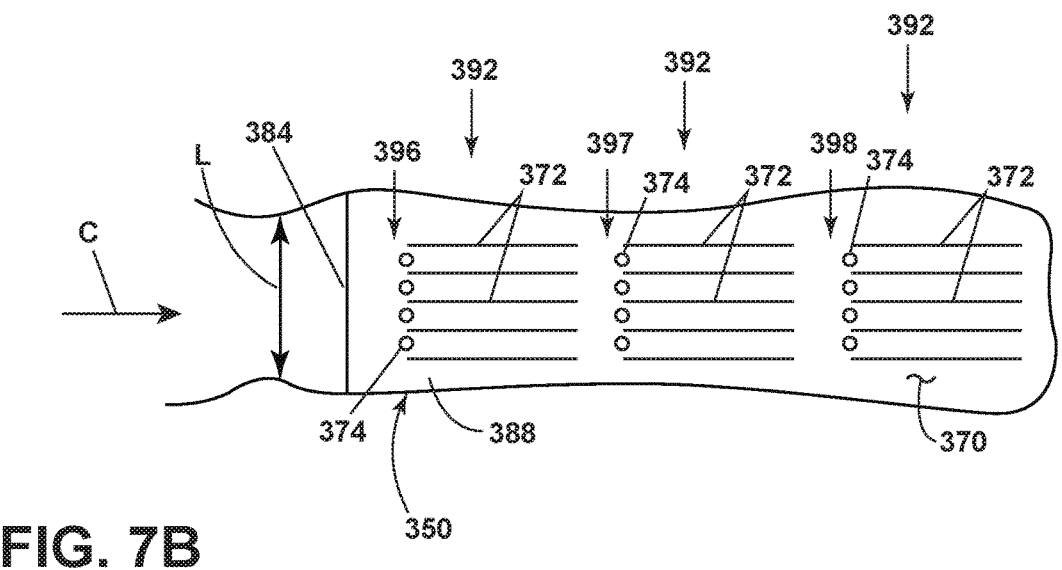

In FIG. 7B, the heat transfer augmentation structures 374 are again arranged in multiple rows 396, 397, 399 intermittently disposed between sets of fins 372 arranged in segmented fin rows 392 where the segmented fin rows 392 are spaced between 0.78 and 12.7 mm (1/32 and ½ inches) apart. Each set of heat transfer augmentation structures 374 are arranged between two adjacent corresponding sets of fins 372.

Figure 7C:
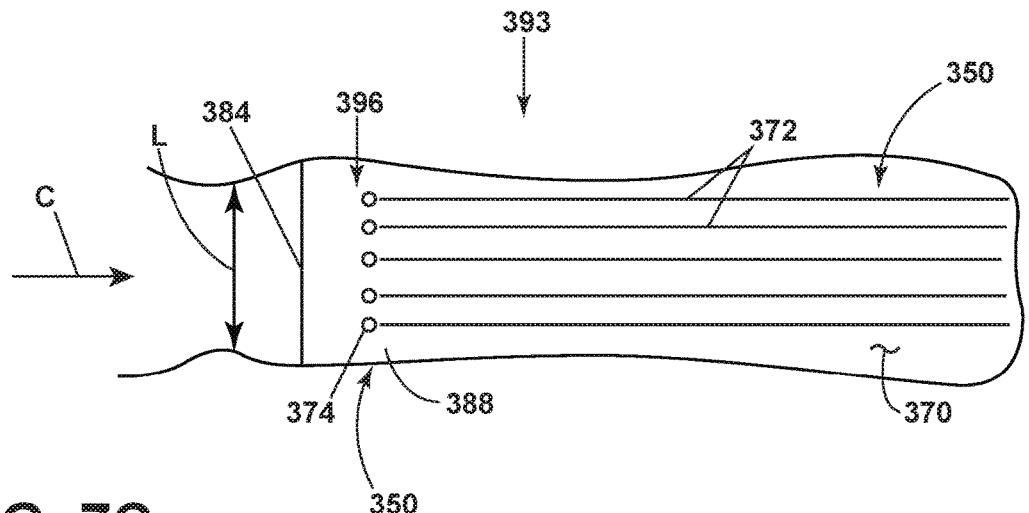

FIG. 7C is similar in form and function to the exemplary embodiment of FIG. 7A, with a single row of a set of fins 393.

Figure 7D:
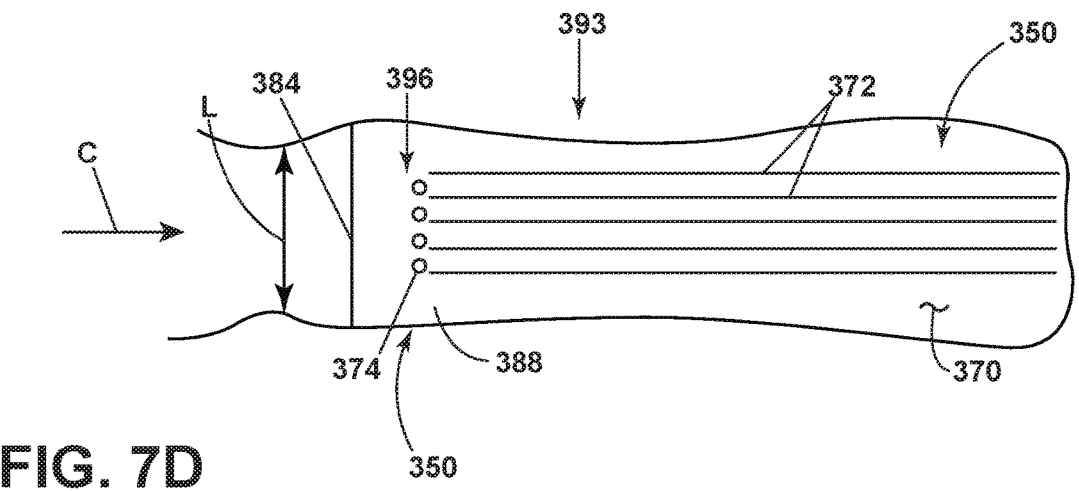

FIG. 7D is similar in form and function to the exemplary embodiment of FIG. 7B, with a single row of a set of fins 393.

Figure 8A:
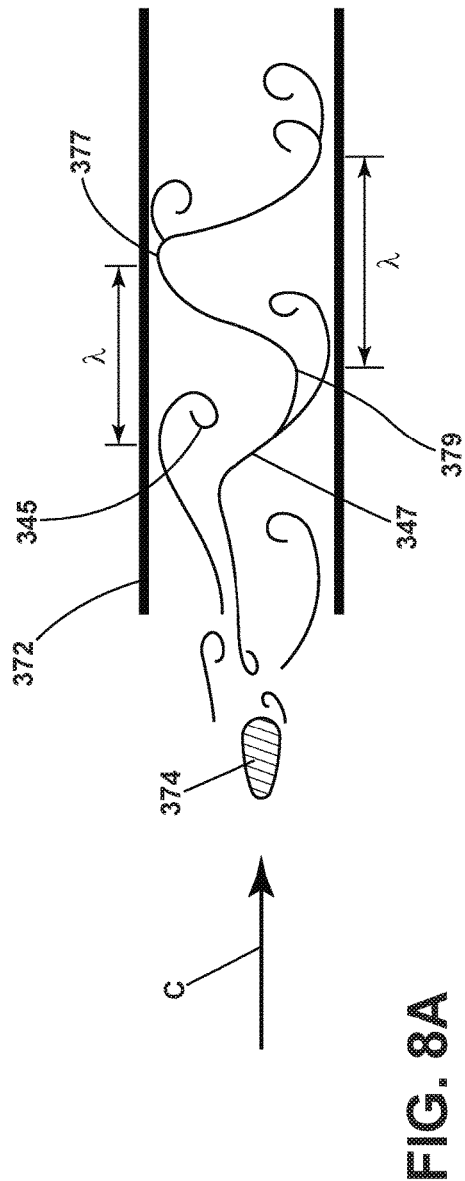
FIGS. 8A and 8B are schematic top view diagrams depicting turbulent flow from vortex generators in accordance with various aspects described herein.

By way of non-limiting example and as illustrated in FIG. 8A, the heat transfer augmentation structures 374 can induce a vortex 345 in the cooling fluid C that passes between the set of fins 372. The vortex 345 increases the rate at which heat is transferred through the set of fins 372 and away from the heat exchanger 350 by essentially sweeping the set of fins 372. A turbulent flow 347 is formed from the placement of the heat transfer augmentation structure 374 with respect to the sets of fins 372 producing crests 377 and troughs 379 in the turbulent flow 347 having a wavelength λ of at least 10 mm and up to 30 mm or even up to 50 mm measured from the adjacent crest 377 or trough 379. By manipulating the approach of the cooling fluid C between the set of fins 372, heat is efficiently moved away from the heat exchanger 350 through the sets of fins 372.

Figure 8B:
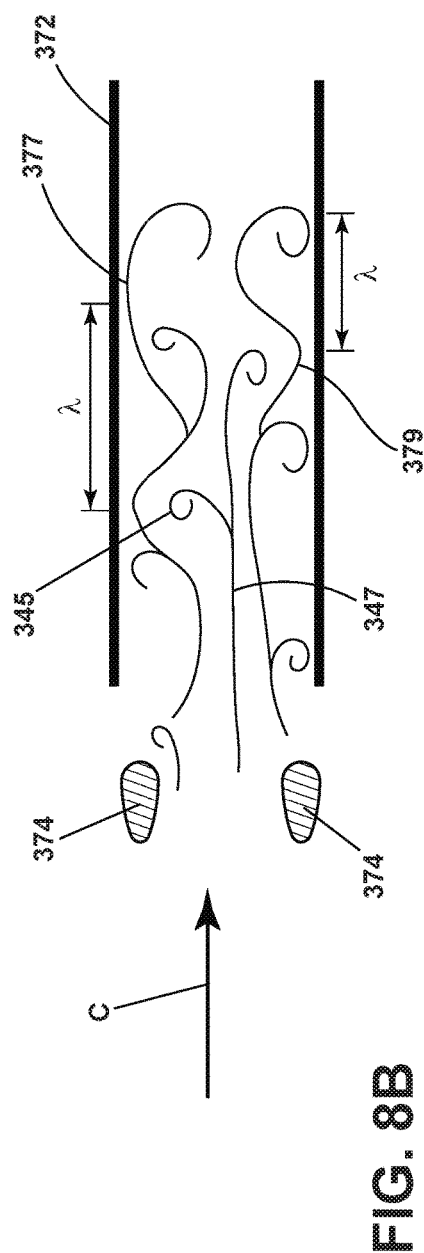

A second exemplary placement of the heat transfer augmentation structures 374 is illustrated in FIG. 8B. Placement of the heat transfer augmentation structures 374 are lined up with corresponding sets of fins 372 so as to produce turbulent flow 347 with wavelengths λ as defined herein of at least 10 mm, and can increase up to 30 mm or up to 50 mm. While the placement of the heat transfer augmentation structures 374 can vary as described in FIGS. 8A and 8B, the outcome of manipulating the cooling fluid C to efficiently move heat away from the heat exchanger is achieved.

It is understood that the orientations of the fins and heat transfer augmentation structures with respect to each other as described herein are non-limiting. Other configurations can be contemplated, for example but not limited to continuous or discontinuous fins where heat transfer augmentation structures can be provided between some discontinuous fins but not all. Staggered with respect to each other or with respect to the sets of fins as illustrated in FIG. 8A, offset from each other or from the sets of fins, variable by having a combination of staggered and offset configurations, in-line as illustrated in FIG. 8B, or random pattern configurations of the heat transfer augmentation structures 374 can also be contemplated, for example but not limited to heat transfer augmentation structures randomly placed in spaces between segmented fins. It can also be contemplated that heat transfer augmentation structures can be both offset and in-line, or any other combination of the disclosure described herein.

Figure 9:
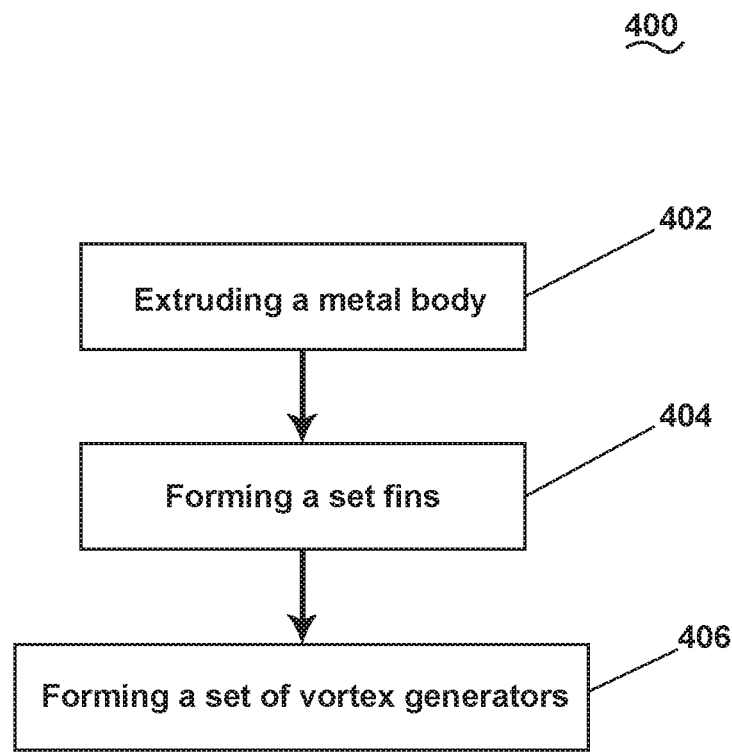
FIG. 9 is a flow chart illustrating a method for forming the exemplary heat exchangers in accordance with various aspects described herein.

FIG. 9 is a flow chart describing a method 400 of forming any of the exemplary heat exchangers described herein. For clarity and ease of description part numbers associated with the first exemplary heat exchanger 50 will be used with it being understood that the method 400 can apply to any of the heat exchangers. At 402, the body 88 is extruded and formed to include the upper surface 70 and the at least one fluid passage 190 in the metal body 88.

At 404, the set of fins 72 is formed wherein the set of fins 72 is attached to the upper surface 70 of the metal body 88. The set of fins 72 can be formed by, for example but not limited to, advancing a skiving blade into the upper surface to form the set of fins 72, machined on, formed with additive manufacturing.

At 406, a set of heat transfer augmentation structures 74 is formed on the upper surface 70 of the body 88. The set of heat transfer augmentation structures 74 can be formed by utilizing a spray additive technique wherein the form of the heat transfer augmentation structure 74 is produced by adding layers in a controlled computerized environment or machined, or by other methods described herein.

It can be further contemplated that forming a set of heat transfer augmentation structures 74 along at least a portion of a length L of the metal body 88 of the heat exchanger 50 includes retrofitting an existing heat exchanger 50 having a set of fins 72 and at least one fluid passage 190 in the metal body 88 with the heat transfer augmentation structures 74 using for example, but not limited to, additive manufacturing techniques. The heat transfer augmentation structures 74 can be formed out of thermal material as described herein so as to passively change shape in response to a change in environmental thermal conditions.

In any of the above disclosures, while the heat transfer augmentation structures 74 are primarily shown on the second surface defining the upper surface 70, the location of the heat transfer augmentation structures 74 is not so limited. The heat transfer augmentation structures can be located on multiple surfaces including a front face.

The various disclosures of systems, methods, and other devices related to the invention disclosed herein provide improved cooling. One advantage that may be realized is that vortices in the cooling fluid flow can be induced, which in turn produces high heat transfer coefficient augmentation. This can result in improved thermal management of turbine engines by air cooling of the engine and gearbox lubricating oils. The above aspects can offer more effective heat exchangers, which correlates to the heat exchanger being lighter and being able to fit in smaller envelops that contemporary designs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heat exchanger comprising:
   a heat exchanger body including a first surface, a second surface opposite the first surface, and at least one conduit configured to carry a flow of heated fluid proximal to the second surface and where the body is arranged to transfer heat from the heated fluid to a cooling fluid passing by the second surface;
   a set of fins extending from the second surface; and
   a set of heat transfer augmentation structures disposed on the second surface to augment the heat transfer from the cooling fluid and upstream from the set of fins with respect to a flow of the cooling fluid;

wherein the set of heat transfer augmentation structures is configured to increased heat transfer by manipulating an approach of the flow of cooling fluid.

2. The heat exchanger of claim 1 wherein the set of heat transfer augmentation structures are arranged in multiple rows extending along at least a portion of a length of the heat exchanger body, with each row having at least one heat transfer augmentation structure.

3. The heat exchanger of claim 2 wherein each row comprises multiple heat transfer augmentation structures.

4. The heat exchanger of claim 3 wherein at least one of the plurality of heat transfer augmentation structures is one of a dimple or a groove in the second surface.

5. The heat exchanger of claim 1 wherein the set of fins are at least one of segmented fins, petal fins, continuous fins or discrete fins.

6. The heat exchanger of claim 5 wherein the set of heat transfer augmentation structures are intermittently disposed between sets of segmented fins.

7. The heat exchanger of claim 1 wherein at least one heat transfer augmentation structure of the set of heat transfer augmentation structures are located between two adjacent fins.

8. The heat exchanger of claim 1 wherein a heat transfer augmentation structure of the set of heat transfer augmentation structures is located in-line with a fin of the set of fins.

9. The heat exchanger of claim 1 wherein the cooling fluid is cooling air passing through a bypass duct of a turbine engine.

10. The heat exchanger of claim 1 wherein at least one of the set of heat transfer augmentation structures is moveable and defines a moveable vortex generator.

11. A heat exchanger comprising:
a heat exchanger body including a first surface, a second surface opposite the first surface, and at least one conduit configured to carry a flow of heated fluid proximal to the second surface and where the body is arranged to transfer heat from the heated fluid to a cooling fluid passing by the second surface;
a set of fins extending from the second surface; and
a set of heat transfer augmentation structures disposed on the second surface, at least one of the set of heat transfer augmentation structures is moveable and defines a moveable vortex generator comprising at least one thermally sensitive portion configured to passively position the moveable vortex generator to augment the heat transfer from the cooling fluid;
wherein the set of heat transfer augmentation structures is configured to increased heat transfer by manipulating an approach of the flow of cooling fluid.

12. The heat exchanger of claim 1 wherein at least one of the heat transfer augmentation structures of the set of heat transfer augmentation structures is on a leading edge of the heat exchanger body.

13. The heat exchanger of claim 12 wherein the set of heat transfer augmentation structures are spaced along a length of the heat exchanger body.

14. A method of retrofitting a heat exchanger having a metal body, with the metal body having an upper surface having a set of fins extending from the upper surface and at least one fluid passage in the metal body, the method comprising:
forming a set of heat transfer augmentation structures on the upper surface and along at least a portion of a length of the metal body of the heat exchanger at its leading edge and lined up with the set of fins.

15. A method of retrofitting a heat exchanger having a metal body, with the metal body having an upper surface having a set of fins and at least one fluid passage in the metal body, the method comprising:
forming a set of heat transfer augmentation structures along at least a portion of a length of the metal body of the heat exchanger at its leading edge, with at least one of the set of heat transfer augmentation structures configured to passively change shape in response to a change in an environmental thermal condition.

16. The method of claim 14 wherein forming the set of heat transfer augmentation structures comprises forming the set of heat transfer augmentation structures utilizing an additive manufacturing technique.

* * * * *